Figures 1, 2:
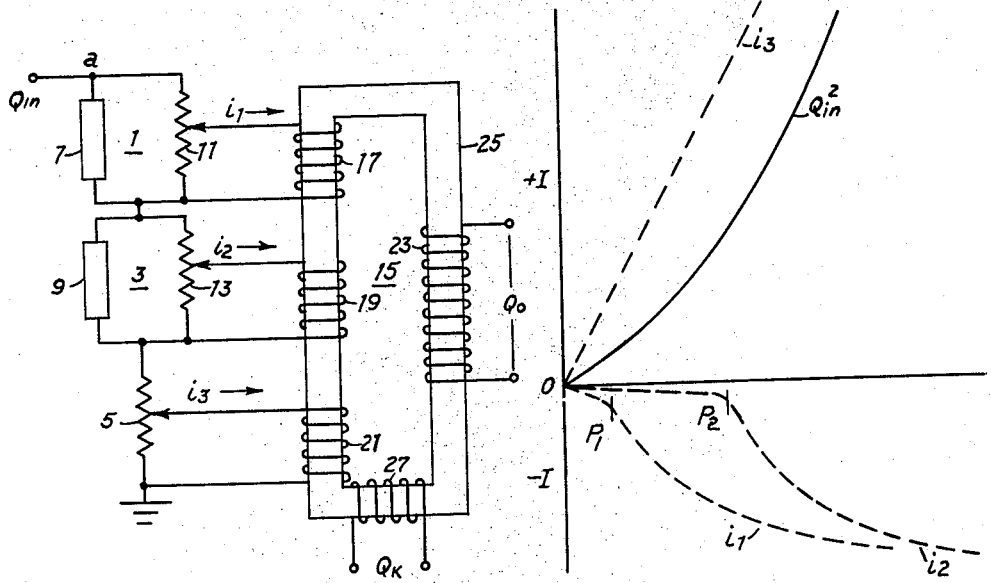

Nov. 8, 1960    R. D. TRUEBLOOD    2,959,350
COMPUTER MULTIPLIER CIRCUIT
Filed June 13, 1956

INVENTOR.
RICHARD D. TRUEBLOOD
BY
ATTORNEYS

United States Patent Office 2,959,350
Patented Nov. 8, 1960

2,959,350

COMPUTER MULTIPLIER CIRCUIT

Richard D. Trueblood, 5337 E. 43rd St.,
Indianapolis, Ind.

Filed June 13, 1956, Ser. No. 591,251

5 Claims. (Cl. 235—194)

(Granted under Title 35, U.S. Code (1952), sec. 266)

The invention described herein may be manufactured and used by or for the Government of the United States of America for governmental purposes without the payment of any royalties thereon or therefor.

The subject invention involves the use of symmetrical nonlinear resistive elements such as "thyrites" or "varistors" in novel networks to produce an electrical output quantity which varies in magnitude as the square of the input. In an embodiment of the invention, the squaring networks are applied to produce an output proportional to the product of two analog-data input quantities.

Each squaring network comprises one or more nonlinear resistors. If more than one resistor is utilized, they are connected in series. In one embodiment, a linear potentiometer is connected in parallel across each nonlinear resistor such that the electrical quantity through the former will vary as a function of the latter. A portion of the quantity passing through each potentiometer is tapped therefrom. These portions are then combined algebraically to produce an output quantity made up of a component proportional to the square of the input quantity and a component of constant magnitude.

In an embodiment of the multiplication network, a squaring network of the kind described is connected between each of two sources of alternating-current potential and the input of a third squaring network. As a result, a composite electrical quantity comprised of the two input quantities exists at the input of the third squaring network. The composite quantity passes through the latter network to a source of constant potential such as ground. The electrical quantities tapped from each potentiometer of the three networks are combined algebraically to produce a resultant quantity having a component proportional to the product of the two input quantities plus a component of constant magnitude. The component of constant magnitude is then eliminated from the output by combining with it an electrical quantity from a third source equal in magnitude and opposite in polarity, such that only the component proportional to the product of the two analog-data inputs remains in the output.

Hereinafter, it should be understood that, wherever appropriate, the term "magnitude" is intended to refer also to amplitude, and the phrase "opposite polarity" is intended to refer also to opposite phase.

Heretofore, multipliers for electrical analog computers have required the use of complicated electromechanical equipment such as that found in servomultipliers, electrodynamometer multipliers, and strain-gauge (vibration) multipliers; or the use of electrical apparatus such as that required in potentiometric-network and Wheatstone-bridge multipliers; of the use of electronic circuitry such as that required in quarter-squares multipliers having function generators of the electron-beam photoformer type, multipliers utilizing pulses, and step multipliers utilizing counter circuitry; or the use of multipliers of the cathode-ray tube type such as crossed-field, and square-beam multipliers.

All of the aforementioned multipliers are subject to one or more of the following disadvantages: insufficient accuracy, excessive weight or cost, inadequacy of the characteristic of input-signal frequency band versus accuracy, inability to multiply rapidly fluctuating direct or alternating-current data, slow time of response, inability to multiply analog-data either in the form of direct or alternating current, functional instability, fragility, and lack of reliability.

It is the principal object of the subject invention to provide a novel multiplier network incorporating a novel square-functioning generator circuit of such inexpensiveness, light weight, accuracy, ruggedness, and data-input adaptability that the disadvantages enumerated above are substantially eliminated or minimized.

In more particularity, the objects of the invention may be stated as follows:

(1) To provide a novel square-function generator.

(2) To provide a square-function generator comprising wave-shaping networks utilizing symmetrical nonlinear resistive elements for approximating a square-function curve through greater variations in the magnitude of the input quantity and with greater accuracy than heretofore obtainable.

(3) To provide a novel electrical network for developing an electrical output quantity proportional to the product of two electrical input quantities.

(4) To provide a novel electrical multiplier network which is operative either for direct-current or alternating-current data inputs.

(5) To provide a novel electrical multiplier network which is responsive almost instantaneously to analog-data inputs having alternating-current frequencies which may vary from zero to the radio-frequency spectrum or higher.

(6) To provide a novel multiplier wherein a fixed 180° phase shift occurs between alternating-current input and output quantities.

(7) To provide a novel multiplier utilizing square-function generators comprised of symmetrical nonlinear resistors.

(8) To provide a novel analog multiplier network which eliminates the need for electron tubes together with their inherent disadvantages such as fragility, associated power supplies, and unreliability.

(9) To provide a novel analog multiplier network which has the attributes of light-weight, ruggedness, flexibility of application, accuracy, and reliability of operation.

(10) To provide a novel analog multiplier of superior economy and engineering simplicity for effectuating the aforesaid objects.

In the operation of the subject invention, each of two analog-data input quantities is squared. Next, the two inputs are added algebraically and the composite quantity representing their sum is squared. Finally, the three squared quantities effectively are combined algebraically and an unwanted constant-magnitude component is eliminated from their sum, such that the portion remaining is proportional to the product of the two analog-data input quantities.

The modus operandi of the subject invention is similar to, but differs materially from, the well known quarter squares principle of multiplier design, a principle which, for example, is embodied necessarily in multipliers constructed to operate in accordance with the relationship, (1) $\quad Q_1 Q_2 = \frac{1}{4}[(Q_1+Q_2)^2 - (Q_1-Q_2)^2]$ wherein $Q_1$ and $Q_2$ represent input data quantities to be multiplied.

In a multiplier constructed in accordance with the subject invention, the input and output quantities of each of the three squaring networks may be expressed:

| Squaring Circuit | Inputs | Outputs |
| --- | --- | --- |
| First | $Q_1$ | $K_1Q_1^2-K_2$ |
| Second | $Q_2$ | $K_1Q_2^2-K_3$ |
| Third | $Q_1+Q_2$ | $-K_1(Q_1+Q_2)^2-K_4$ |

The symbols $Q_1$ and $Q_2$ represent analog-data input quantities, and $K_1$ through $K_4$, inclusive, represent inherent constant characteristics of the respective squaring networks. When the outputs are added algebraically, a quantity represented by the following relationship, $$-2K_1Q_1Q_2-(K_2+K_3+K_4)$$

is obtained.

To make the last expression directly proportional to the produce of the input data quantities, $Q_1$ and $Q_2$, it is necessary only to add a third quantity, $Q_k$, equal to $K_2+K_3+K_4$, thereby leaving as the single output the product, $-2K_1Q_1Q_2$.

The comparison of the quarter-squares principle with that of the invention reveals several important differences. For example, in a multiplier operating in accordance with the quarter-squares principle, it is necessary first to provide circuitry for producing $Q_1+Q_2$ and $Q_1-Q_2$, representing the sum and difference, respectively, of the two input data quantities, $Q_1$ and $Q_2$. That such is the case is apparent from the mathematical statement of the principle set forth in Equation 1 above. Furthermore, after the input sum and difference quantities are squared in appropriate square function generators, it then becomes necessary to provide further circuitry for subtracting the squared difference quantity $(Q_1-Q_2)^2$ from the squared sum $(Q_1+Q_2)^2$.

As the result of the invention of a novel square function generator and its incorporation in the novel multiplier disclosed herein, adding and subtracting circuitry of the kind required in quarter-squares multipliers is eliminated.

Figure 3:
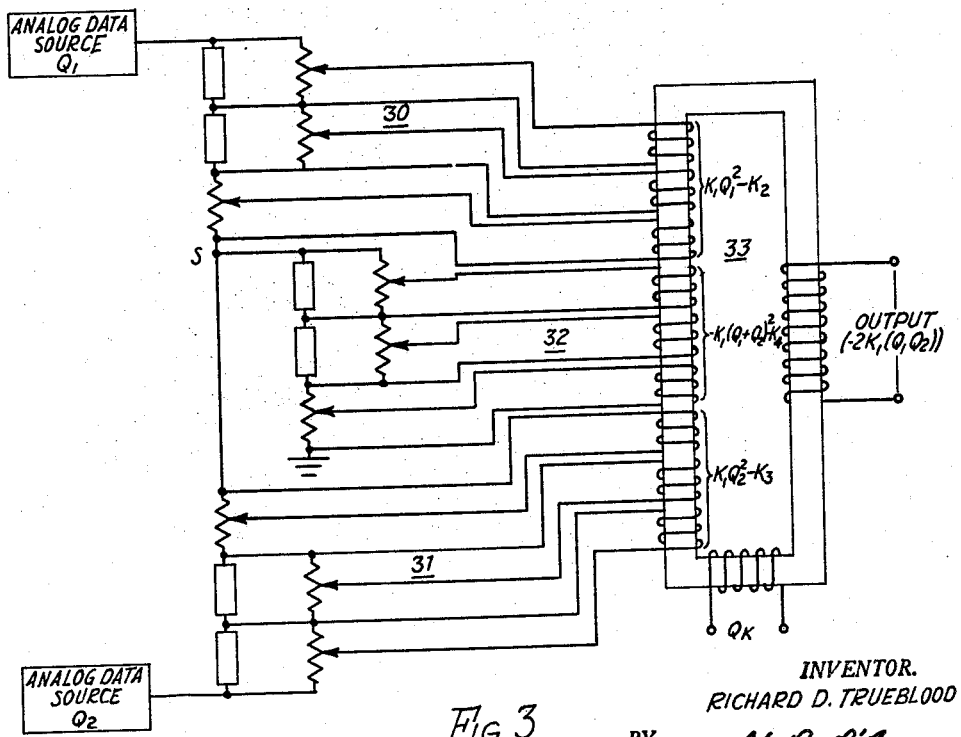

The foregoing summary of the invention, discussion of the problem evoking its origination, and statement of its objects are intended merely to facilitate the development of an understanding and appreciation of some of its principal features, not to restrict its scope. It is probable that additional objects and features of the invention will become apparent after reference to the following detailed description made in conjunction with the accompanying drawings wherein Figure 1 is a schematic diagram of a novel squaring network constructed in accordance with the invention, Figure 2 is a graphic representation of the manner in which the respective voltage-current characteristics of the nonlinear resistive elements comprising the novel square function generator of Figure 1 may be combined to produce the required square-law output, and Figure 3 is a schematic diagram representing an analog-data multiplying network constructed in accordance with the invention.

Fundamentally, the square-function generator of Figure 1 comprises wave-shaping networks 1 and 3 and potentiometer 5 connected in series between a source of alternating-current input quantity $Q_{in}$ and a source of constant potential such as ground, and algebraic adder 15 which combines current portions derived from wave-shaping networks 1 and 3 and potentiometer 5. As will be explained below, the wave-shaping networks and the potentiometer may be constructed or adjusted so that the portions combined in adder 15 will yield an output quantity, $Q_0$, proportional to $Q_{in}^2$ plus a constant quantity $-Q_k$. This constant quantity easily can be prevented from appearing in the output $Q_0$ by inserting into the adder a quantity $Q_k$ equal in magnitude and opposite in polarity to the unwanted quantity $Q_k$. In Figure 1, for example, the constant quantity, $Q_k$, for cancelling $-Q_k$ is inserted on coil 27. It also should be noticed that the adder 15 is operative only when the input quantity $Q_{in}$ is an alternating current. However, it should be understood that the invention is not restricted to the use of this form of adder. Other types of adders may be used which will operate for alternating or direct-current input quantities.

Each of the wave-shaping networks 1 and 3 comprises a symmetrical nonlinear resistive element such as 7 and 9 and a potentiometer such as 11 and 13 connected in parallel.

As is well known in the art, symmetrical nonlinear resistors are semi-conductors having current conductivity represented by the expression $$I=KE^n$$

where I is for current, E is for voltage, K is a constant (ampere at one volt), and $n$ is an exponent. Another important characteristic of such resistors is that below certain critical voltage levels, depending upon their physical dimensions and inherent electrical characteristics, conduction is negligible. Accordingly, resistor 7 may begin to be nonlinearly conductive at a voltage level somewhat higher than that at which resistor 1 becomes conductive. The significance of this characteristic in the construction of an embodiment of the square-function generator will be considered in more detail below. A portion of the respective currents in potentiometer branches 11 and 13 are diverted by the potentiometer pickoff arms through primary coils 17 and 19. Likewise, a portion of the input current $Q_{in}$ is diverted via the pickoff arm of potentiometer 5 through primary coil 21 of the adder 15.

The adder 15 constitutes essentially a transformer having a core 25, a three-winding primary comprising coils 17, 19, and 21, and a single winding secondary comprising coil 23. Another coil 27, which also may be considered to be a primary winding, makes it possible to insert an electrical quantity which effectively cancels the unwanted constant quantity from the output of secondary coil 23, thereby leaving an output quantity, $Q_0$, equal to $-KQ_{in}^2$. The value of K will depend primarily upon the magnitude of current portions $i_1$, $i_2$, and $i_3$ passing into the adder from the wave-shaping networks 1 and 3, and, also the coefficient of coupling between the primary and secondary windings.

The manner in which the current portions $i_1$, $i_2$, and $i_3$ may be combined in the adder to yield a squared output quantity is represented graphically in Figure 2. The curves of Figure 2 are not to scale and are intended merely to facilitate an explanation of the operation of the square-function generator of Figure 1. The dotted lines $i_1$, $i_2$, and $i_3$ represent the variation of current through the adder coils 17, 19, and 21, respectively, of Figure 1 as the potential of the input quantity increases. From the position of the curves of Figure 2, it is apparent that the instantaneous polarity of $i_1$ and $i_2$ is continuously opposite to the instantaneous polarity of $i_3$. The adder 15 sums algebraically the instantaneous values of $i_1$ and $i_2$ with the instantaneous values of $i_3$ to produce the desired square-function output represented by the solid line $Q_{in}^2$. For each point on the horizontal axis, the corresponding point on the output curve $Q_{in}^2$ is determined by passing a vertical line through the said point, summing the respective ordinates of curves $i_1$ and $i_2$ as measured along the common vertical line, and then subtracting the sum from the point where the vertical line intersects curve $i_3$. To make the polarity of curves $i_1$ and $i_2$ opposite to that of curve $i_3$, it is necessary only to wind primary coils 17 and 19 in a direction opposite to that of primary coil 21, or vice versa. Alternatively the connections to the coils may be reversed. It should be noticed that, as the potential of the input quantity $Q_{in}$ increases, the potential of point $a$ of Figure 1 increases and the slopes of the curves of current portions $i_1$ and $i_2$ begin to decrease. This occurs because the conductivity of nonlinear resistors 7 and 9 increases rapidly in accordance with a power function as the potential at point $a$ increases.

The following rationalization will be helpful in understanding the shapes of curves $i_1$ and $i_2$. Assume that a linear resistor is inserted in wave-shaping network 1 in place of symmetrical nonlinear resistor 7. An increasing potential at point $a$ will cause a linear increase in the instantaneous magnitude of the current portion $i_1$ at a rate dependent upon the setting of the pickoff arm of potentiometer 11. However, when nonlinear resistor 7 is in wave-shaping network 1, the fact that its current conductivity increases at a rate proportional to a power function (usually greater than the third) of the applied potential causes the current passing through the resistor of potentiometer 11 to increase at a diminishing rate until the point is reached where the conductivity of nonlinear resistor 7 begins to approximate that of a short circuit, at which time further increases in the potential at point $a$ effectively produces a current of decreasing magnitude through the resistor of potentiometer 11. This phenomenon of a current portion $i_1$ diminishing in magnitude as potential increases is not shown in Figure 2 inasmuch as such is unnecessary for explaining the operation of the generator of Figure 1.

It should be noticed that a square-function generator in accordance with the invention may have only one wave-shaping network and one potentiometer connected in series between the source of input data $Q_{in}$ and the source of constant potential such as ground. With reference to Figures 1 and 2, such a generator may include only wave-shaping network 1, potentiometer 5, and the adder 15. Accordingly, the current portions fed to the adder may be represented by the curves of $i_1$ and $i_3$, respectively. By proper selection of the electrical characteristics of the nonlinear resistor 7, proper adjustment of the potentiometer 11 of wave-shaping network 1, and adjustment of potentiometer 5 the curve of $i_1$ may be "shaped" and the slope of $i_3$ may be established such that their algebraic sum through a limited range of potential variation corresponds to a square-function. However, to extend the range through which the square-function is obtained one or more additional wave-shaping networks may be added. For example, the addition of wave-shaping network 3, together with its current portion $i_2$, produces such a result. Nonlinear resistor 9 should be chosen so that it will become nonlinearly conductive at a potential level $p_2$, which is somewhat higher than the potential level $p_1$ at which nonlinear resistor 7 becomes conductive. Accordingly, the curve of $i_2$ may have a steep negative slope in potential ranges where the curve of $i_1$ has a zero or positive slope.

It should be apparent from the foregoing that by proper selection of components for, and adjustment of, further waveshaping circuits, the range of potential variation through which a square-function output may be generated may be greatly extended. The effect of the linear portions of the curves of $i_1$ and $i_2$, which are represented in Figure 2 as existing between zero potential and potential levels $p_1$ and $p_2$, respectively, may be substantially nullified by proper adjustment of the wave-shaping networks 1 and 3.

The manner in which three square-function generators of the kind shown in Figure 1 may be interconnected to form a multiplier for two alternating-current analog-data quantities $Q_1$ and $Q_2$ is represented schematically in Figure 3. Independent sources of analog-data $Q_1$ and $Q_2$ are connected to the respective inputs of two square-function generators represented generally by the numerals 30 and 31. The electrical quantities $Q_1$ and $Q_2$ pass through the square-function generator 30 and 31 to point $s$ where they combine algebraically and pass to the input terminal of a third square-function generator designated generally by the numeral 32. Current portions from the wave-shaping networks are summed algebraically in the adder indicated generally by numeral 33. The structure and operation of each of the square-function generators 30, 31, and 32 are the same as those set forth above for the generator of Figure 1. A single adder of the type illustrated in Figure 1 may be used to combine algebraically the current portions from each wave-shaping circuit of the three square-function generators. As in the generator of Figure 1, the coils carrying the current portions to be added comprise the primary of the transformer-type adder 33, and a single coil comprises the secondary from which the desired combined output is derived. As suggested in Figure 3, current portions in the primary coils, when combined, may be represented by the following expression, $$K_1Q_1^2 - K_2 + K_1Q_2^2 - K_3 - K_1(Q_1+Q_2)^2 - K_4$$

which, upon simplification, may be expressed in the form, $$-2K_1(Q_1Q_2) - (K_2+K_3+K_4)$$

In a manner similar to that used in Figure 1, the unwanted constant quantity, $$-(K_2+K_3+K_4)$$

is prevented from appearing in the output by inserting into the adder 33 a quantity $Q_k$ equal in magnitude but opposite in polarity.

It should be understood that the wave-shaping networks of the embodiments described herein for illustrative purposes may vary in configuration provided that each has an output which has a nonlinear monotonic characteristic of variation throughout a portion of the range of variation of the input quantity.

The details of an embodiment of the invention as illustrated in the accompanying drawings and set forth in the foregoing description are intended merely to facilitate the practice of the invention by persons skilled in the art. The scope of the invention is represented in the following claims.

What is claimed is:

1. In an analog multiplier, a square-function generator comprising: a source of an electrical quantity to be squared; a source of constant potential; a first linear resistive element; at least one wave-shaping network consisting of a second linear resistive element and a symmetrical nonlinear resistor connected in parallel relation; means connecting the said first resistive element and the said wave-shaping network in series-conductive relation between the said sources of electrical quantity and constant potential; means for algebraically adding electrical quantities to produce an output sum; and means passing a portion of the respective electrical quantities present in the said first and second linear resistive elements to the said adder such that the output sum is proportional to the square of the said input quantity plus a constant quantity; and means eliminating the said constant quantity from the said output sum.

2. A square function generator comprising: a source of a variable electrical input quantity to be squared; a source of constant reference potential; first, second, and third potentiometers, each of said potentiometers consisting of a resistor and a slidable pickoff arm; means coupling the said potentiometer resistors in series-conductive relation between the said input-quantity and reference-potential sources; first and second nonlinear resistors coupled in parallel with the said second and third potentiometer resistors, respectively; and means for algebraically adding electrical quantities present on the pickoff arms of the said first, second, and third potentiometers to produce an electrical output quantity proportional to the square of the said input quantity.

3. An analog multiplier for producing an electrical output representative of the product of two electrical input quantities comprising: a source of a first electrical-input quantity to be multiplied; a source of a second electrical-input quantity to be multiplied; a square function generator responsive to the said first electrical quantity and comprising a first linear resistive element connected in series-conductive relation with at least one wave-shaping network consisting of a second linear resistive element and a symmetrical nonlinear resistor connected in parallel relation, an algebraic adder, and means for passing an electrical-quantity portion from each of the said first and second linear resistive elements to the said adder such that the algebraic sum of said portions is proportional to the square of the said first electrical input quantity plus a constant quantity, and means coupled to the said adder for eliminating the said constant quantity; a second means responsive to the said second quantity for producing an output proportional to the square of the said second quantity; a third means algebraically combining the two said electrical input quantities to form a composite electrical quantity; a fourth means responsive to the said composite electrical quantity for producing an output quantity proportional to the square of the said composite electrical quantity; a fifth means algebraically combining the respective outputs of the said first, second, and fourth squaring means to form a resultant electrical quantity representing the product of the said first and second electrical input quantities.

4. An analog multiplier as represented in claim 3 wherein the said first and second linear resistive elements comprise potentiometers and the said electrical-quantity passing means comprises the pickoff arms of the potentiometers.

5. An analog multiplier as represented in claim 4 wherein said fifth means comprises a transformer.

References Cited in the file of this patent

UNITED STATES PATENTS

| | | |
|---|---|---|
| 2,401,404 | Bedford | June 4, 1946 |
| 2,401,447 | Wipff | June 4, 1946 |
| 2,491,095 | Ennis | Dec. 13, 1949 |
| 2,643,348 | De Boisblanc et al. | June 23, 1953 |

OTHER REFERENCES

Electronic Engineering (Mynall II), June 1947, page 179.

Electronic Engineering (Mynall), September 1947, page 285.

IRE Transactions, "Electronic Computer" (Kovach et al.), June 1954, page 44.